United States Patent
Thakkar (10) Patent No.: US 11,227,052 B2
(45) Date of Patent: Jan. 18, 2022

(54) MALWARE DETECTION WITH DYNAMIC OPERATING-SYSTEM-LEVEL CONTAINERIZATION

(71) Applicant: THE BOEING COMPANY, Chicago, IL (US)

(72) Inventor: Rahul C. Thakkar, Leesburg, VA (US)

(73) Assignee: THE BOEING COMPANY, Chicago, IL (US)

(*) Notice: Subject to any disclaimer, the term of this patent is extended or adjusted under 35 U.S.C. 154(b) by 441 days.

(21) Appl. No.: 16/418,394

(22) Filed: May 21, 2019

(65) Prior Publication Data
US 2020/0372153 A1 Nov. 26, 2020

(51) Int. Cl.
*G06F 21/56* (2013.01)

(52) U.S. Cl.
CPC .......... *G06F 21/566* (2013.01); *G06F 21/565* (2013.01); *G06F 21/568* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,987,610 A * | 11/1999 | Franczek | ............. | G06F 21/564 726/24 |
| 8,321,940 B1 * | 11/2012 | Pereira | ................. | G06F 21/554 726/23 |
| 9,117,079 B1 * | 8/2015 | Huang | ................ | G06F 9/44505 |
| 9,323,576 B2 | 4/2016 | Hotra et al. | | |
| 9,348,622 B2 | 5/2016 | Emelyanov et al. | | |
| 9,690,936 B1 * | 6/2017 | Malik | ................... | G06F 21/562 |
| 10,108,445 B2 | 10/2018 | Hotra | | |
| 10,192,052 B1 * | 1/2019 | Singh | .................... | G06F 21/566 |
| 10,671,726 B1 * | 6/2020 | Paithane | .............. | G06F 21/562 |
| 10,783,239 B2 * | 9/2020 | Woodworth, Jr. | .... | G06F 21/563 |

(Continued)

OTHER PUBLICATIONS

McCarty, "A practical introduction to container terminology", Red Hat Inc., Feb. 2018, pp. 1-30.

(Continued)

*Primary Examiner* — Richard A McCoy
(74) *Attorney, Agent, or Firm* — Womble Bond Dickinson (US) LLP (57) ABSTRACT

A method of protecting a computer from malicious software includes receiving a computer file, and scanning, via anti-malware, the computer file for known malicious software. The method include, when the anti-malware fails to detect known malicious software in the computer file, performing a dynamic operating-system-level containerization to access content of the computer file, including creating and launching an isolated container on the computer. The method includes accessing the content of the computer file in the isolated container on the computer, and monitoring execution of computer-readable program code in the isolated container as the content of the computer file is accessed. And the method includes performing a remedial action when as the execution of computer-readable program code in the isolated container is monitored, a pattern in the execution is detected that indicates the computer file contains malicious software that is otherwise unknown.

24 Claims, 3 Drawing Sheets

(56) References Cited

U.S. PATENT DOCUMENTS

| | | | | |
|---|---|---|---|---|
| 2004/0098607 | A1* | 5/2004 | Alagna | G06F 21/566 |
| | | | | 726/24 |
| 2005/0223239 | A1* | 10/2005 | Dotan | G06F 21/554 |
| | | | | 713/188 |
| 2007/0174915 | A1* | 7/2007 | Gribble | G06F 21/566 |
| | | | | 726/24 |
| 2018/0137282 | A1* | 5/2018 | Rasanen | G06F 21/566 |
| 2019/0205537 | A1* | 7/2019 | Das | G06F 21/563 |
| 2020/0019702 | A1* | 1/2020 | Tong | G06F 21/56 |

OTHER PUBLICATIONS

Wang, "Containers 101: Docker fundamentals", InfoWorld, Jun. 2016, pp. 1-16.

Rouse M., "Antimalware (anti-malware)", SearchSecurity.com, Dec. 2017, retrieved Mar. 28, 2019 from https://searchsecurity.techtarget.com/definition/antimalware?vgnextfmt=print.

* cited by examiner

MALWARE DETECTION WITH DYNAMIC OPERATING-SYSTEM-LEVEL CONTAINERIZATION

TECHNOLOGICAL FIELD

The present disclosure relates generally to computer security and, in particular, to malware detection with dynamic operating-system-level containerization.

BACKGROUND

The wide spread use of computers has led some misguided individuals and/or entities to employ a variety of techniques to spread malicious software (oftentimes referred to as "malware") to computers of unsuspecting users or entities. Malware generally refers to malicious, harmful and/or undesirable executables and/or data including computer viruses, spy programs, unsolicited advertisements, advertising executables, undesirable content and the like. Anti-malware programs are designed to detect and/or eliminate malware. Detection is typically accomplished by scanning files and folders on a user's computer using a periodically updated repository of known malware. Some of these repositories maintain signatures of known malware, such as hashes of known malware. By comparing the files on a user's computer with a repository known malware, some malware may be detected. If malware is detected in a given file, the file can be flagged for attention and/or may be repaired or deleted.

Anti-malware is often sufficient at detecting malware, but it is also generally limited to known malware. Therefore it would be desirable to have a system and method that takes into account at least this issue, as well as other possible issues.

BRIEF SUMMARY

Example implementations of the present disclosure are directed to improved malware detection with dynamic operating-system-level containerization. Example implementations recognize that a computer file may include malware even when anti-malware fails to detect it, oftentimes because the malware is unknown to the anti-malware. Example implementations adds a new pipeline for checking a computer file for malware by actually accessing content of the computer file in one or more isolated containers that mimic different configurations of computer. According to example implementations, by operating-system-level virtualization, malware is made to believe it is running on a real computer. But in reality, the malware is running and being monitored in an isolated container, which is an isolated user-space instance on the computer.

The present disclosure thus includes, without limitation, the following example implementations.

Some example implementations provide a computer comprising a memory configured to store computer-readable program code; and processing circuitry configured to access the memory, and execute the computer-readable program code to cause the computer to at least: receive a computer file; scan, via anti-malware, the computer file for known malicious software; and when the anti-malware fails to detect known malicious software in the computer file, perform a dynamic operating-system-level containerization to access content of the computer file, the computer caused to create and launch an isolated container on the computer; access the content of the computer file in the isolated container on the computer; monitor execution of second computer-readable program code in the isolated container as the content of the computer file is accessed; and perform a remedial action when as the execution of second computer-readable program code in the isolated container is monitored, a pattern in the execution is detected that indicates the computer file contains malicious software that is otherwise unknown.

In some example implementations of the computer of any preceding example implementation, or any combination of any preceding example implementations, the processing circuitry is configured to execute the computer-readable program code to cause the computer to further access the content of the computer file outside the isolated container when the pattern in the execution is not detected.

In some example implementations of the computer of any preceding example implementation, or any combination of any preceding example implementations, the processing circuitry is configured to execute the computer-readable program code to cause the computer to further delete or erase the isolated container from the computer after execution of the second computer-readable program code in the isolated container.

In some example implementations of the computer of any preceding example implementation, or any combination of any preceding example implementations, the computer file is an executable file, and the execution of second computer-readable program code in the isolated container includes execution of the executable file in the isolated container.

In some example implementations of the computer of any preceding example implementation, or any combination of any preceding example implementations, the computer file is a non-executable file, and the computer caused to create the isolated container includes the computer caused to locate, and install in the isolated container, an application program designed to read the content of the computer file, and wherein the execution of second computer-readable program code in the isolated container includes execution of an application program in the isolated container to read the content of the computer file.

In some example implementations of the computer of any preceding example implementation, or any combination of any preceding example implementations, the processing circuitry is configured to execute the computer-readable program code to cause the computer to further notify a user of the computer when the computer fails to locate the application program designed to read the content of the computer file.

In some example implementations of the computer of any preceding example implementation, or any combination of any preceding example implementations, the computer has a plurality of resources, and the computer caused to create the isolated container includes the computer caused to allocate a portion of the plurality of resources to the isolated container, the portion of the plurality of resources selected to mimic a configuration of computer on which the malicious software is executable.

In some example implementations of the computer of any preceding example implementation, or any combination of any preceding example implementations, the plurality of resources include networking resources, and the computer caused to allocate the portion of the plurality of resources includes the computer caused to allocate a portion of the networking resources to the isolated container.

In some example implementations of the computer of any preceding example implementation, or any combination of any preceding example implementations, the computer caused to perform the dynamic operating-system-level containerization includes the computer caused to create and launch a plurality of isolated containers on the computer, the plurality of isolated containers being allocated respective portions of the plurality of resources selected to mimic different configurations of computer on which the malicious software is executable, wherein the computer is caused to access the content of the computer file, and monitor execution of the second computer-readable program code, in each of the plurality of isolated containers, and wherein the computer is caused to perform the remedial action when the pattern in the execution is detected in any of the plurality of isolated containers.

In some example implementations of the computer of any preceding example implementation, or any combination of any preceding example implementations, the computer caused to perform the remedial action includes the computer caused to notify a user of the computer, delete or erase the computer file, or block access to the content of the computer file outside the isolated container.

In some example implementations of the computer of any preceding example implementation, or any combination of any preceding example implementations, the computer caused to scan the computer file includes the computer caused to compare the content of the computer file with a repository of known malicious software, and wherein the computer caused to perform the remedial action includes the computer caused to report the malicious software for addition to the repository.

In some example implementations of the computer of any preceding example implementation, or any combination of any preceding example implementations, the computer caused to perform the remedial action further includes the computer caused to quantify the pattern in the execution to categorize the malicious software in a category of malicious software, and wherein the computer caused to report the malicious software further includes the computer caused to report the category of malicious software, the malicious software added to the repository in the category when the category is known, and the category further added to the repository when the category is unknown.

Some example implementations provide a method of protecting a computer from malicious software, the method comprising the computer receiving a computer file; scanning, via anti-malware, the computer file for known malicious software; and when the anti-malware fails to detect known malicious software in the computer file, performing a dynamic operating-system-level containerization to access content of the computer file, including creating and launching an isolated container on the computer; accessing the content of the computer file in the isolated container on the computer; monitoring execution of computer-readable program code in the isolated container as the content of the computer file is accessed; and performing a remedial action when as the execution of computer-readable program code in the isolated container is monitored, a pattern in the execution is detected that indicates the computer file contains malicious software that is otherwise unknown.

In some example implementations of the method of any preceding example implementation, or any combination of any preceding example implementations, the method further comprises the computer accessing the content of the computer file outside the isolated container when the pattern in the execution is not detected.

In some example implementations of the method of any preceding example implementation, or any combination of any preceding example implementations, the method further comprises the computer deleting or erasing the isolated container from the computer after execution of the computer-readable program code in the isolated container.

In some example implementations of the method of any preceding example implementation, or any combination of any preceding example implementations, the computer file is an executable file, and the execution of computer-readable program code in the isolated container includes execution of the executable file in the isolated container.

In some example implementations of the method of any preceding example implementation, or any combination of any preceding example implementations, the computer file is a non-executable file, and creating the isolated container includes locating, and installing in the isolated container, an application program designed to read the content of the computer file, and wherein the execution of computer-readable program code in the isolated container includes execution of an application program in the isolated container to read the content of the computer file.

In some example implementations of the method of any preceding example implementation, or any combination of any preceding example implementations, the method further comprises the computer notifying a user of the computer when the computer fails to locate the application program designed to read the content of the computer file.

In some example implementations of the method of any preceding example implementation, or any combination of any preceding example implementations, the computer has a plurality of resources, and creating the isolated container includes allocating a portion of the plurality of resources to the isolated container, the portion of the plurality of resources selected to mimic a configuration of computer on which the malicious software is executable.

In some example implementations of the method of any preceding example implementation, or any combination of any preceding example implementations, the plurality of resources include networking resources, and allocating the portion of the plurality of resources includes allocating a portion of the networking resources to the isolated container.

In some example implementations of the method of any preceding example implementation, or any combination of any preceding example implementations, performing the dynamic operating-system-level containerization includes creating and launching a plurality of isolated containers on the computer, the plurality of isolated containers being allocated respective portions of the plurality of resources selected to mimic different configurations of computer on which the malicious software is executable, wherein the content of the computer file is accessed, and execution of the computer-readable program code is monitored, in each of the plurality of isolated containers, and wherein the remedial action is performed when the pattern in the execution is detected in any of the plurality of isolated containers.

In some example implementations of the method of any preceding example implementation, or any combination of any preceding example implementations, performing the remedial action includes the computer deleting or erasing the computer file, or blocking access to the content of the computer file outside the isolated container.

In some example implementations of the method of any preceding example implementation, or any combination of any preceding example implementations, scanning the computer file includes comparing the content of the computer file with a repository of known malicious software, and wherein performing the remedial action includes reporting the malicious software for addition to the repository.

In some example implementations of the method of any preceding example implementation, or any combination of any preceding example implementations, performing the remedial action further includes quantifying the pattern in the execution to categorize the malicious software in a category of malicious software, and wherein reporting the malicious software further includes reporting the category of malicious software, the malicious software added to the repository in the category when the category is known, and the category further added to the repository when the category is unknown.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure relate generally to computer security and, in particular, to malware detection with dynamic operating-system-level containerization.

Figure 1:
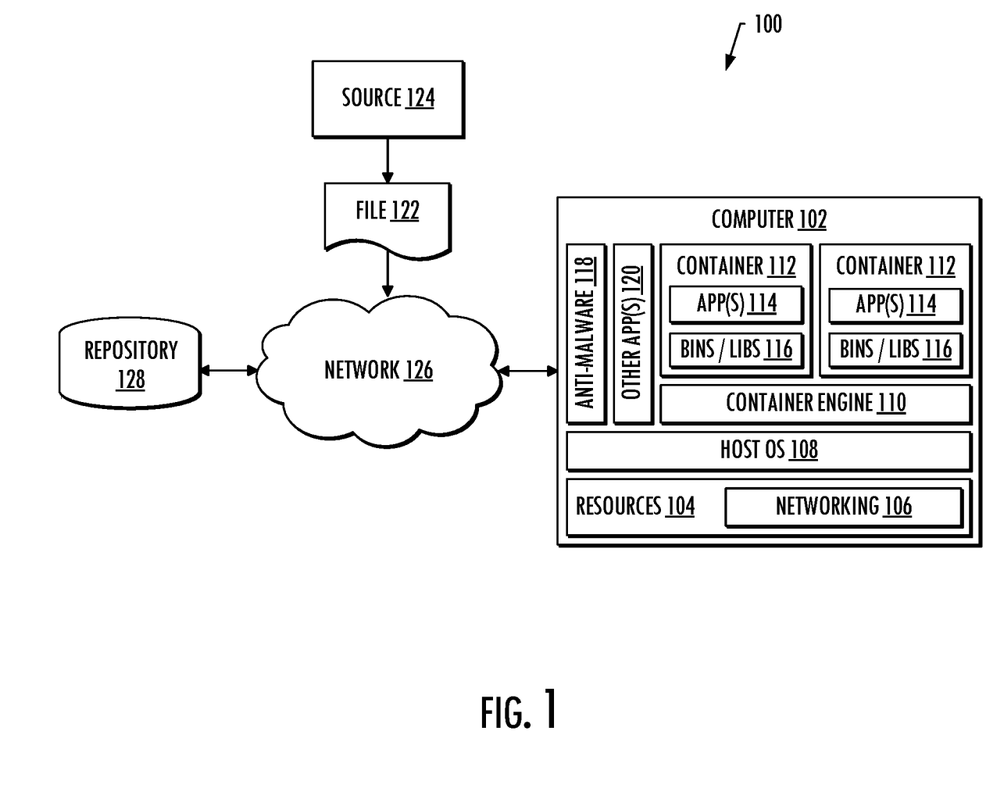
FIG. 1 illustrates a network system including a computer for which example implementations of the present disclosure may be useful.

FIG. 1 illustrates a network system 100 including a computer 102 for which example implementations of the present disclosure may be useful. As described herein, the computer is generally any electronic machine configured to store and process information such as, for example, data, computer programs and/or other suitable electronic information. Examples of suitable computers include a desktop computer, portable computer (e.g., laptop computer, tablet computer), mobile phone (e.g., cell phone, smartphone), wearable computer (e.g., smartwatch), or the like.

As shown, the computer 102 has a plurality of resources 104 (sometimes referred to as "system resources"), which are generally hardware components of limited availability that provide the computer's capabilities and contribute to its performance. In some examples, these resources include computing resources, memory resources and, as shown, networking resources 106.

The computer 102 includes a host operating system (OS) 108 configured to manage the resources 104, and a container engine 110 operable above the host OS to create and launch one or more isolated containers 112. Each container packages (containerization) one or more application programs (apps) 114 with its dependencies (binaries/libraries) 116 in an isolated user-space instance, also at times known as a zone, virtual private server, partition, virtual environment, virtual kernel or jail.

An isolated container 112 is an operating-system-level (OS-level) virtualization. It is distinct from and generally requires less overhead than a hardware virtualization in which a hypervisor (instead of a container engine) is used to create a virtual machine to emulate a computer. The isolated container may appear as a real computer from the point of view of the apps 114 executed in it, but the apps only have visibility to the resources 104 of the computer 102 allocated to it, believing these to be all that are available. In this regard, the computer may also have anti-malware 118 and/or other apps 120 operable above the host OS, outside the container, that have visibility to all of the resources of the computer.

According to example implementations of the present disclosure, the computer 102 is configured to receive a computer file 122. As shown, the computer may receive the computer file from a source 124 across one or more computer networks 126. It should be understood, however, that the computer file may be received in any of a number of different manners. In other examples, the computer file may be received from the computer's own resources 104—or more particularly, the computer's memory resources. The computer file may likewise be any of a number of different types of computer files. In some examples, the computer file is an executable file, but in other examples, the computer file is a non-executable file such as an image file, audio file, video file, script file, binary file or the like. In this regard, an executable file may itself be an app, while a non-executable file may be accessible via an app.

Also according to example implementations, the computer 102 is configured to scan, via the anti-malware 118, the computer file 122 for known malicious software (malware). In some examples, this includes the computer configured to compare the content of the computer file with a repository 128 of known malware, which may be maintained locally at the computer (e.g., by the anti-malware 118), remotely over a computer network 126, or both in which the repository is remotely maintained with a local copy on the computer.

When the anti-malware 118 fails to detect known malware in the computer file 122, the computer 102 is configured to perform, in some examples via the container engine 110, a dynamic OS-level containerization to access content of the computer file. In this regard, the computer is caused to create and launch an isolated container 112 on the computer. This may be dynamic in the sense that the isolated container is only created and launched to access the content of the computer file when the scan via the anti-malware fails to detect known malware in the computer file. And in some examples, the isolated container may be created and launched from a corresponding container image, which may be maintained locally on the computer, or remote from but accessible by the computer.

In some examples in which the computer 102 has the plurality of resources 104, creation of the isolated container 112 includes the computer configured to allocate a portion of the plurality of resources to the isolated container. The portion of the plurality of resources is selected to mimic a configuration of computer on which the malware is executable. The configuration of computer in some examples refers to a configuration of resources. In some further examples, allocation of the portion of the plurality of resources includes the computer configured to allocate a portion of the networking resources 106 to the isolated container.

The computer 102 is configured access the content of the computer file 122 in the isolated container 112 on the computer, and monitor execution of (second) computer-readable program code in the isolated container as the content of the computer file is accessed, in some examples via the container engine 110. In some examples in which the computer file is an executable file, the execution of (second) computer-readable program code in the isolated container includes execution of the executable file in the isolated container.

In other examples in which the computer file is a non-executable file, creation of the isolated container includes the computer configured to locate, and install in the isolated container, an app 114 (application program) designed to read the content of the computer file. This may include, for example, an image viewer for an image file, an audio player for an audio file, or a video player for a video file. In some of these other examples, the execution of (second) computer-readable program code in the isolated container includes execution of an app in the isolated container to read the content of the computer file. In some further examples, the computer is further configured to notify a user of the computer when the computer fails to locate the app designed to read the content of the computer file.

The computer 102 (container engine 110) may monitor execution of the (second) computer-readable program code in the isolated container 112 in any of a number of different manners. In some examples, the container engine may monitor known rules of code execution, acting in a fashion similar to malware analysis used by authors of some anti-malware. The container engine may therefore be aware of execution patterns that diverge from normal and well-known functions of an executable file (computer file) or an app reading a non-executable file (computer file). For example, an executable file is typically not known to capture central processing unit (CPU) interrupt service routines, become memory resident on termination, or overwrite portions of its virtual storage device. The container engine may maintain known normal behaviors of code executing on the computer. In various examples, this may be done by a brute force list, or an evolving data model trained with machine learning on known behaviors.

The computer 102 is further configured to perform a remedial action when as the execution of (second) computer-readable program code in the isolated container 112 is monitored, a pattern in the execution is detected (e.g., by the container engine 110) that indicates the computer file 122 contains malware that is otherwise unknown. According to example implementations, added computer security provided as described herein may be applied locally on the computer, as opposed to through a server computer in a client-server system.

In other examples, the added security provided as described herein may be applied remotely at a server computer in communication with the computer 102, such as over the computer network 126. In some of these examples, the computer may send the computer file 122 to the server computer. The server computer may receive the computer file, perform the dynamic OS-level containerization, access the content of the computer file in an isolated container 112 on the server computer, and monitor execution of computer computer-readable program code in the isolated container. The server computer may also perform the remedial action. Additionally, the server computer may notify the computer that a pattern in the execution has been detected that indicates the computer file contains malicious software; and in response, the computer also perform the same or another remedial action.

In some examples, the computer 102 may be further configured to access the content of the computer file 122 outside the isolated container 112 when the pattern in the execution is not detected. The computer may also be configured to delete or erase the isolated container from the computer after execution of the (second) computer-readable program code in the isolated container. This may occur regardless of whether malware is detected. That is, the computer may delete or erase the isolated container when the pattern in the execution that indicates the computer file contains malware is not detected. Likewise, the computer may delete or erase the isolated container when the pattern in the execution is detected.

In some examples, the computer 102 is configured to create and launch a plurality of isolated containers 112 on the computer (two shown in FIG. 1), such as from respective corresponding container images. In these examples, the plurality of isolated containers are allocated respective portions of the plurality of resources 104 selected to mimic different configurations of computer on which the malware is executable. The computer may access the content of the computer file 122, and monitor execution of the (second) computer-readable program code, in each of the plurality of isolated containers. The computer may then perform the remedial action when the pattern in the execution is detected in any of the plurality of isolated containers. Similar to before, the computer may delete or erase the isolated containers after execution of the (second) computer-readable program code in the respective isolated containers.

In some examples, the computer 102 and its anti-malware 118 and container engine 110 may operate to provide the above-described added computer security automatically without user input. In other examples, the computer may solicit permission from the user before proceeding with various operations. This may include, for example, soliciting permission to create, launch and monitor an isolated container 112. It may also include soliciting permission to notify a vendor, developer or author of the anti-malware of new malware when detected.

To further illustrate more particular example implementations of the present disclosure, consider an executable file (computer file 122) such as an .exe file on the well-known Microsoft® Windows® operating system. On the computer 102, the anti-malware 118 clears the executable file as allowable because it does not contain any patterns that match known patterns in its most current repository 128 of known malware. The anti-malware now prepares to execute the executable file in a controlled and secure virtual environment.

From a collection of container images, the anti-malware 118 selects one or more corresponding container images for respective one or more isolated containers in which to execute the executable file. As described above, an isolated container is a complete description of a computer, and includes a virtual description of allocated resources 104 of the computer 102, various device drivers, and possibly also a network connector (networking resources 106) with has a virtual connection leading up to a decoy network setup. The container engine 110 creates the isolated container 112 from a container image, launches the container, and monitors code executed inside the container.

For each isolated container 112, either in series or in parallel with other isolated containers, the anti-malware 118 may copy the executable file (computer file 122) into the container's virtual data storage device (memory resource), also described and held inside the container. The container engine 110 launches the isolated container, and executes the executable file inside the container. As the executable file is executed inside the isolated container, the container engine monitors the code being executed in the isolated container. In this regard, the container engine may compare way in which the code is executed with the normal known patterns.

If the container engine 110 finds a discrepancy with the normal known patterns, it may flag the executable file as malicious software, and terminate the isolated container 112. The container engine may retain the potentially-infected, isolated container for further evaluation such as by vendor, developer or author of the anti-malware 118. The container engine may also alert the anti-malware 118 that a potentially suspect behavior was detected. In response, the anti-malware may take an appropriate remedial action. For example, the anti-malware may warn the user, quarantine the executable file and/or perform one or more other custom or configured remedial actions. The container engine may further delete or erase the isolated container after execution of the executable file in the isolated container.

Now consider a non-executable file (computer file 122) such as an image file, audio file, video file, script file, binary file or the like. On the computer 102, the anti-malware 118 and container engine 110 may operate similar to above for an executable file. Additionally, the anti-malware may locate or otherwise look for an application program 114 designed to read the content of the computer file. Again, this may include an image viewer for an image file, an audio player for an audio file, or a video player for a video file. The anti-malware may then also install the application program (app) in the isolated container 112.

In the case of either an executable file or a non-executable file (computer file 122), when a new malware pattern is detected and verified by the anti-malware 118, it may be added to a local copy of the repository 128 of known malware. This information, if possible, may also sent immediately or at a later date to a vendor, developer or author of the anti-malware 118 to update a master repository of known malware.

According to example implementations, the computer 102 may be configured to any one or more of a number of remedial actions when the pattern in the execution is detected that indicates the computer file 122 contains malware. In some examples, the computer is configured to notify a user of the computer, delete or erase the computer file, or block access to the content of the computer file outside the isolated container 112. In some examples, the remedial action includes the computer configured to report the malware for addition to the repository 128 of known malware. In some further examples, the computer may quantify the pattern in the execution to categorize the malware in a category of malware. In these examples, the computer may also report the category of malware, with the malware added to the repository in the category when the category is known, and the category further added to the repository when the category is unknown.

Figure 2:
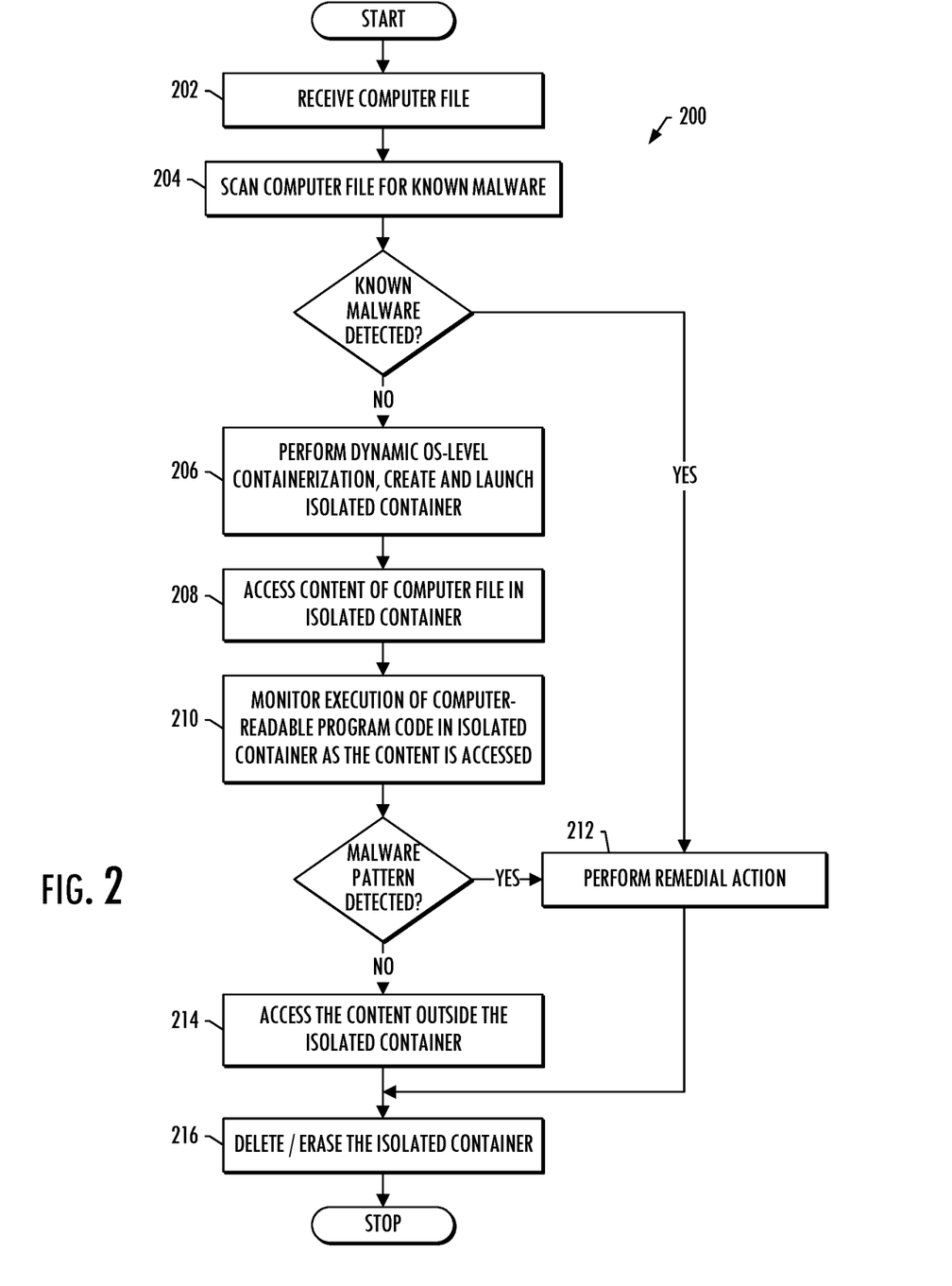
FIG. 2 is a flowchart illustrating various steps in a method of protecting a computer from malicious software, according to example implementations.

FIG. 2 is a flowchart illustrating various steps in a method 200 of protecting a computer 102 from malicious software. As shown at block 202, the method includes the computer receiving a computer file 122. The method includes scanning, via anti-malware 118, the computer file for known malicious software, as shown at block 204. When the anti-malware fails to detect known malicious software (malware) in the computer file, the method includes performing a dynamic operating-system-level containerization to access content of the computer file, including creating and launching an isolated container 112 on the computer, as shown at block 206.

The method includes accessing the content of the computer file 122 in the isolated container 112 on the computer 102, as shown at block 208. The method includes monitoring execution of (second) computer-readable program code in the isolated container as the content of the computer file is accessed, as shown at block 210. The method includes performing a remedial action when as the execution of (the second) computer-readable program code in the isolated container is monitored, a pattern in the execution is detected that indicates the computer file contains malicious software that is otherwise unknown, as shown at block 212. This may also be performed when the anti-malware 118 detects known malware in the computer file. As shown in block 214, in some further examples, the method further includes accessing the content of the computer file outside the isolated container when the pattern in the execution is not detected. And as shown in block 216, in some examples, the method further includes deleting or erasing the isolated container from the computer after execution of the (second) computer-readable program code in the isolated container.

Figure 3:
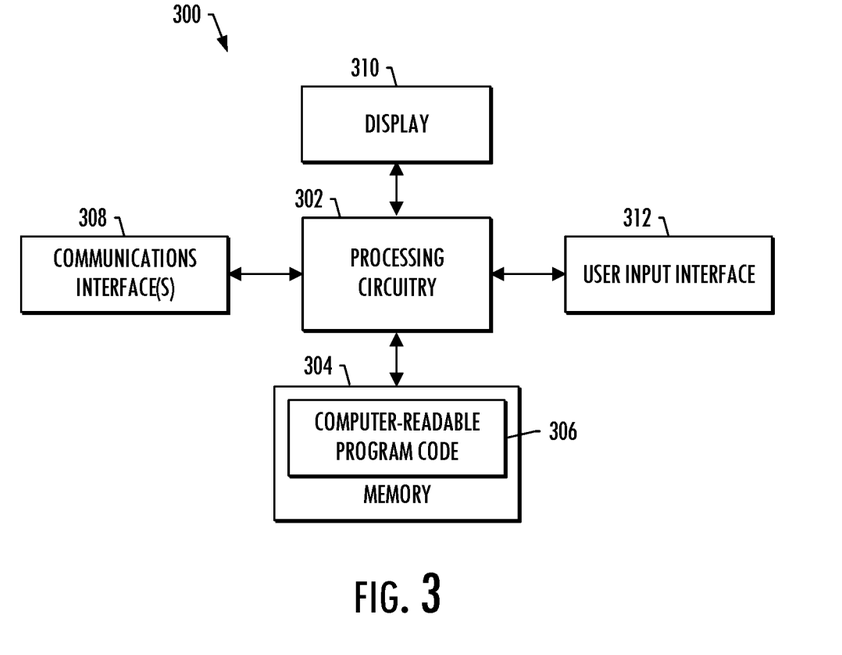
FIG. 3 illustrates a computer that may correspond to the computer in FIG. 1, according to some example implementations.

FIG. 3 illustrates a computer 300 that may correspond to the computer 102 in FIG. 1, according to some example implementations of the present disclosure. As described above, the computer may include a plurality of resources (e.g., resources 104), which are generally hardware components of limited availability that provide the computer's capabilities and contribute to its performance. The computer may therefore include one or more of each of a number of hardware components such as, for example, processing circuitry 302 (e.g., processor unit) connected to a memory 304 (e.g., storage device).

The processing circuitry 302 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 304 (of the same or another computer).

The processing circuitry 302 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 304 is generally any piece of computer hardware that is capable of storing information such as, for example, data, computer programs (e.g., computer-readable program code 306) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 304, the processing circuitry 302 may also be connected to one or more interfaces for displaying, transmitting and/or receiving information. The interfaces may include a communications interface 308 (e.g., communications unit) and/or one or more user interfaces. The communications interface may be configured to transmit and/or receive information, such as to and/or from other computer(s), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 310 and/or one or more user input interfaces 312 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the computer 300, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, a computer 300 may include a processing circuitry 302 and a computer-readable storage medium or memory 304 coupled to the processing circuitry, where the processing circuitry is configured to execute computer-readable program code 306 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer comprising:
   a memory configured to store computer-readable programcode;
   a plurality of resources including networking resources; and
   processing circuitry configured to access the memory, and execute the computer-readable programcode to cause the computer to at least:
      receive a non-executable computer file comprising one of an image file, an audio file, or a video file;
      scan, via anti-malware, the computer file for known malicious software;
      and in response to the scan via the anti-malware failing to detect known malicious software in the computer file, perform the following steps:
         perform a dynamic operating-system-level containerization to access content contained in the computer file comprising:
            create and launch a plurality of isolated containers, each container being an operating system level virtualization and being allocated a different respective portion of the plurality of resources selected to mimic different configurations of the computer;
            locate an application program designed to open and operate the contained content, the application program including second computer-readable program code;
            install the located application program in each of the isolated containers including allocating a respective portion of the networking resources to the each isolated container;
            for each isolated container:
               use the allocated respective portion of the plurality of resources to establish one of the different configurations within the each isolated container to mimic a corresponding configuration of the computer;
               access the content of the computer file in the each isolated container on the computer by opening and operating the contained content using the application;
               monitor execution of second computer-readable programcode in the isolated container as the content of the computer file is accessed including during the opening and operating;
               quantify a pattern in the execution during the operating;
               determine that the pattern indicates that the computer file contains malicious software by determining that the pattern diverges from known rules of code execution of the located application, wherein the pattern includes at least one of capturing of cpu interrupt service routines, becoming memory resident on termination, or overwriting portions of the applications virtual storage device;
            in response to the determining, perform the following steps:
               perform a remedial action including quarantining the computer file to prevent access to the computer file from outside the each isolated container;
               report the computer file and the pattern to a repository of known malicious software;
               compare the pattern with known patterns of malicious execution stored in the repository;
               categorized the determined malicious software in a category of malicious software;
               wherein when the comparison includes a determination that the pattern is known to the repository, the reporting includes reporting the computer file and the pattern in the category; and
               wherein when the comparison includes a determination that the pattern is unknown to the repository, the reporting includes adding the category to the repository and reporting the computer file and the pattern in the category.

2. The computer of claim 1, wherein the processing circuitry is configured to execute the computer-readable program code to cause the computer to further:
   access the content of the computer file outside the isolated container when the pattern in the execution is not detected.

3. The computer of claim 1, wherein the computer file is an executable file, and the execution of second computer-readable program code in the isolated container includes execution of the executable file in the isolated container.

4. The computer of claim 1, wherein the computer file is a non-executable file, and the computer caused to create the isolated container includes the computer caused to locate, and install in the isolated container, an application program designed to read the content of the computer file, and
   wherein the execution of second computer-readable program code in the isolated container includes execution of an application program in the isolated container to read the content of the computer file.

5. The computer of claim 4, wherein the processing circuitry is configured to execute the computer-readable program code to cause the computer to further:
   notify a user of the computer when the computer fails to locate the application program designed to read the content of the computer file.

6. The computer of claim 1, wherein the processing circuitry is configured to execute the computer-readable program code to cause the computer to further:
   delete or erase the isolated container from the computer after execution of the second computer-readable program code in the isolated container.

7. The computer of claim 1, wherein the computer has a plurality of resources, and the computer caused to create the isolated container includes the computer caused to allocate a portion of the plurality of resources to the isolated container, the portion of the plurality of resources selected to mimic a configuration of computer on which the malicious software is executable.

8. The computer of claim 7, wherein the plurality of resources include networking resources, and the computer caused to allocate the portion of the plurality of resources includes the computer caused to allocate a portion of the networking resources to the isolated container.

9. The computer of claim 7, wherein the computer caused to perform the dynamic operating-system-level containerization includes the computer caused to create and launch a plurality of isolated containers on the computer, the plurality of isolated containers being allocated respective portions of the plurality of resources selected to mimic different configurations of computer on which the malicious software is executable,
- wherein the computer is caused to access the content of the computer file, and monitor execution of the second computer-readable program code, in each of the plurality of isolated containers, and
- wherein the computer is caused to perform the remedial action when the pattern in the execution is detected in any of the plurality of isolated containers.

10. The computer of claim 1, wherein the computer caused to perform the remedial action includes the computer caused to notify a user of the computer, delete the computer file, or block access to the content of the computer file outside the isolated container.

11. The computer of claim 1, wherein the computer caused to scan the computer file includes the computer caused to compare the content of the computer file with a repository of known malicious software, and
- wherein the computer caused to perform the remedial action includes the computer caused to report the malicious software for addition to the repository.

12. The computer of claim 11, wherein the computer caused to perform the remedial action further includes the computer caused to quantify the pattern in the execution to categorize the malicious software in a category of malicious software, and
- wherein the computer caused to report the malicious software further includes the computer caused to report the category of malicious software, the malicious software added to the repository in the category when the category is known, and the category further added to the repository when the category is unknown.

13. A method of protecting a computer from malicious software, the computer comprising:
- a memory configured to store computer-readable program code;
- a plurality of resources including networking resources; and
- processing circuitry configured to access the memory, and execute the computer-readable programcode to cause the computer implement the method to at least:
  - receive a non-executable computer file comprising one of an image file, an audio file, or a video file;
  - scan, via anti-malware, the computer file for known malicious software;
  - and in response to the scan via the anti-malware failing to detect known malicious software in the computer file, perform the following steps:
  - perform a dynamic operating-system-level containerization to access content contained in the computer file comprising:
    - create and launch a plurality of isolated containers, each container being an operating system level virtualization and being allocated a different respective portion of the plurality of resources selected to mimic different configurations of the computer;
    - locate an application program designed to open and operate the contained content, the application program including second computer-readable program code;
    - install the located application program in each of the isolated containers including allocating a respective portion of the networking resources to the each isolated container;
    - for each isolated container:
      - use the allocated respective portion of the plurality of resources to establish one of the different configurations within the each isolated container to mimic a corresponding configuration of the computer;
      - access the content of the computer file in the each isolated container on the computer by opening and operating the contained content using the application;
      - monitor execution of second computer-readable program code in the isolated container as the content of the computer file is accessed including during the opening and operating;
      - quantify a pattern in the execution during the operating;
      - determine that the pattern indicates that the computer file contains malicious software by determining that the pattern diverges from known rules of code execution of the located application, wherein the pattern includes at least one of capturing of cpu interrupt service routines, becoming memory resident on termination, or overwriting portions of the applications virtual storage device;
      - in response to the determining, perform the following steps:
        - perform a remedial action including quarantining the computer file to prevent access to the computer file from outside the each isolated container;
        - report the computer file and the pattern to a repository of known malicious software;
        - compare the pattern with known patterns of malicious execution stored in the repository;
        - categorized the determined malicious software in a category of malicious software;
        - wherein when the comparison includes a determination that the pattern is known to the repository, the reporting includes reporting the computer file and the pattern in the category; and
        - wherein when the comparison includes a determination that the pattern is unknown to the repository, the reporting includes adding the category to the repository and reporting the computer file and the pattern in the category.

14. The method of claim 13 further comprising the computer:
accessing the content of the computer file outside the isolated container when the pattern in the execution is not detected.

15. The method of claim 13 further comprising the computer:
deleting or erasing the isolated container from the computer after execution of the computer-readable program code in the isolated container.

16. The method of claim 13, wherein the computer file is an executable file, and the execution of computer-readable program code in the isolated container includes execution of the executable file in the isolated container.

17. The method of claim 13, wherein the computer file is a non-executable file, and creating the isolated container includes locating, and installing in the isolated container, an application program designed to read the content of the computer file, and
wherein the execution of computer-readable program code in the isolated container includes execution of an application program in the isolated container to read the content of the computer file.

18. The method of claim 17 further comprising the computer:
notifying a user of the computer when the computer fails to locate the application program designed to read the content of the computer file.

19. The method of claim 13, wherein the computer has a plurality of resources, and creating the isolated container includes allocating a portion of the plurality of resources to the isolated container, the portion of the plurality of resources selected to mimic a configuration of computer on which the malicious software is executable.

20. The method of claim 19, wherein the plurality of resources include networking resources, and allocating the portion of the plurality of resources includes allocating a portion of the networking resources to the isolated container.

21. The method of claim 19, wherein performing the dynamic operating-system-level containerization includes creating and launching a plurality of isolated containers on the computer, the plurality of isolated containers being allocated respective portions of the plurality of resources selected to mimic different configurations of computer on which the malicious software is executable,
wherein the content of the computer file is accessed, and execution of the computer-readable program code is monitored, in each of the plurality of isolated containers, and
wherein the remedial action is performed when the pattern in the execution is detected in any of the plurality of isolated containers.

22. The method of claim 13, wherein performing the remedial action includes the computer deleting or erasing the computer file, or blocking access to the content of the computer file outside the isolated container.

23. The method of claim 13, wherein scanning the computer file includes comparing the content of the computer file with a repository of known malicious software, and
wherein performing the remedial action includes reporting the malicious software for addition to the repository.

24. The method of claim 23, wherein performing the remedial action further includes quantifying the pattern in the execution to categorize the malicious software in a category of malicious software, and
wherein reporting the malicious software further includes reporting the category of malicious software, the malicious software added to the repository in the category when the category is known, and the category further added to the repository when the category is unknown.

* * * * *

UNITED STATES PATENT AND TRADEMARK OFFICE
CERTIFICATE OF CORRECTION

PATENT NO. : 11,227,052 B2  
APPLICATION NO. : 16/418394  
DATED : January 18, 2022  
INVENTOR(S) : Rahul C. Thakkar It is certified that error appears in the above-identified patent and that said Letters Patent is hereby corrected as shown below:

In the Claims

Column 13, Claim 1, Line 28, "computer-readable programcode;" should read -- computer-readable program code; --

Column 13, Claim 1, Line 32, "computer-readable programcode to" should read -- computer-readable program code to --

Column 14, Claim 1, Line 2, "computer-readable programcode in" should read -- computer-readable program code in --

Column 14, Claim 1, Line 12, "at least one of capturing of" should read -- at least one of the capturing of --

Column 15, Claim 13, Line 61, "computer-readable programcode to" should read -- computer-readable program code to --

Signed and Sealed this  
Nineteenth Day of April, 2022

Katherine Kelly Vidal  
*Director of the United States Patent and Trademark Office*